United States Patent Office 3,347,952
Patented Oct. 17, 1967

3,347,952
PROCESS FOR THE MANUFACTURE OF LIQUID HEAVY AROMATIC HYDROCARBON - FORMALDEHYDE RESINS AND THEIR CURED RESINS
Sanae Tanaka, Katsura Yokoyama, and Asao Seki, Tokyo, Japan, assignors to Mitsubishi Petrochemical Company Limited, Tokyo, Japan, a corporation of Japan
No Drawing. Filed Dec. 10, 1963, Ser. No. 329,356
Claims priority, application Japan, Dec. 12, 1962, 37/54,999; Feb. 13, 1963, 38/5,877
2 Claims. (Cl. 260—838)

The present invention relates to a process for the manufacture of liquid heavy aromatic hydrocarbon-formaldehyde resins and their cured resins.

The object of the present invention is to manufacture curable liquid heavy aromatic hydrocarbon-formaldehyde resins by condensing a mixture of heavy aromatic hydrocarbons with formaldehyde in presence of an acidic catalyst.

The further object of the present invention is to manufacture cured heavy aromatic hydrocarbon-formaldehyde resins by heat-curing the liquid heavy aromatic hydrocarbon-formaldehyde resins together with hexamethylenetetramine in presence of catalyst.

The still further object of the present invention is to manufacture cured heavy aromatic hydrocarbon-formaldehyde resins by adding hexamethylenetetramine to a resin which is obtained by condensing the liquid heavy aromatic hydrocarbon-formaldehyde resin with an aromatic hydrocarbon having electron donative group in presence of catalyst, and by heat-curing the mixture.

According to the present invention, we provide a process for the manufacture of liquid heavy aromatic hydrocarbon-formaldehyde resins which can be cured, characterized in that heavy hydrocarbon oil containing mixture of heavy aromatic hydrocarbon having at least 8 carbon atoms is reacted with formaldehyde in presence of acidic catalyst at a temperature of 0 to 300° C. under a pressure of 1 to 100 atmospheric pressure.

The heavy aromatic hydrocarbons which may be used in the process of the present invention are for example polyalkylbenzenes and alkylnaphthalines such as xylene, pseudocumene, mesitylene, durene, m-ethyltoluene, 1,3-diethylbenzene and 1,3-dimethyl-5-ethylbenzene. These compounds are contained as a mixture in large amounts in heavy platformate which is by-produced in petroleum platforming, in heavy oil which is obtained in ethylene plants by naphtha cracking, in distillation residue which is obtained in the manufacture of ethylbenzene step, in a xylene bottom which is obtained in an aromatic hydrocarbon extraction step, in unpolymerized oil which is obtained in the manufacture of petroleum resin or in coal tar distillates. These compounds are thus easily and cheaply available. These heavy aromatic hydrocarbons as the mixture can be used as a mixture condensation with formaldehyde without fractionation.

Further, when paraffins other than aromatic hydrocarbon are contained in a raw oil, the paraffins can be used as a solvent without separating them and then can be recovered after the reaction with formaldehyde. Similarly, when a raw oil contains olefins other than aromatic hydrocarbons it can be used with the olefins in it, but if necessary the olefins can be removed from the raw oil by sulfuric acid washing. The colour of product can be lightened by the removal of olefins.

Formaldehyde can be used in the form of aqueous solution, a lower polymer or the gaseous monomer.

The condensation reaction can be carried out in presence of acidic catalyst, for example inorganic acid, organic acid or Lewis acid, at a temperature of 0 to 300° C. under a pressure of 1 to 100 atmospheric pressure. After the reaction, the acidic catalyst is removed and when the product is decolored by the use of acid clay, if necessary unreacted substances are distilled out under a reduced pressure and liquid heavy aromatic hydrocarbon-formaldehyde resin can be obtained.

The obtained resin is a pale-yellow to reddish brown viscous liquid and is insoluble in alcohol, but is soluble in ether, chloroform, benzene, toluene and xylene.

The oxygen content of the obtained resin is 5 to 20% and the resin can be further cured with a curing agent. It has superior electric insulation, water-proof, alkali-proof and acid-proof properties and the price of the resin is low. Therefore, considerable usages of the resin not only as paint and adhesive but also as thermosetting resin are expected.

The curing of toluene-formaldehyde resin or xylene-formaldehyde resin has already been investigated, but the curing of a resin of heavy aromatic hydrocarbon having higher molecular weight than toluene and xylene with formaldehyde has not been known.

The heavy aromatic hydrocarbons such as pseudocumene and mesitylene have a higher reactivity with formaldehyde than toluene and xylene and they can be condensed to the resins having a melting point of 30° to 150° C. with reaction of formaldehyde in presence of acidic catalyst as described in the example shown below. These resins have a higher curing velocity than the prior toluene and xylene resins and it is possible to decrease of employing amount of phenols or amines.

The curing of the liquid heavy aromatic hydrocarbon-formaldehyde resin may be carried out by the following procedures:

(1) The liquid heavy aromatic hydrocarbon-formaldehyde resin is mixed with hexamethylene tetramine and then heat-cured under a normal pressure or elevated pressure.

(2) The liquid heavy aromatic hydrocarbon-formaldehyde resin is condensed with an aromatic hydrocarbon having electron donative group such as phenols, aromatic amines, phenol-ethers, aromatic halides, aromatic thiocyanate and primary phenol-formaldehyde resin in presence of inorganic acids, for example sulfuric acid, oleum phosphoric acid and meta-phosphoric acid; or organic acids, for example p-toluene-sulfonic acid, benzoic acid, phthalic acid and formic acid; or Lewis acids, for example boron trifluoride, aluminium chloride, zinc chloride and titanic chloride to obtain a resin having a melting point of 30° to 200° C. The obtained resin is mixed with hexamethylene tetramine and then heat-cured under a normal pressure or elevated pressure.

The present invention is illustrated but not limited by the following examples in which the parts and percentages are by weight.

*Example 1*

100 parts of xylene bottom which were obtained in aromatics extraction step of Udex process and in which the composition was wholly consisted of aromatic components and the main component was 45% of ethyltoluene, 10% of pseudocumene, 7% of mesitylene and 10% of n-propyl-benzene were added with 80 parts of 37% Formalin and 28 parts of concentrated sulfuric acid, and the mixture was heated and agitated at the temperature of 80° C. for five hours. After the completion of reaction, the catalyst was removed and the unreacted materials were removed under a reduced pressure to obtain 40 parts of liquid heavy aromatic hydrocarbon-formaldehyde resin.

*Analysis.*—C, 81.69%; H, 9.08%; O, 9.23%. Molecular weight: 225.

*Example 2*

100 parts of the so-called "unpolymerized petroleum resin oil" which were the unreacted residue obtained when unsaturated components in $C_9$ fraction of petroleum cracked oil were polymerized by the use of a cationic catalyst and consisted of about 75% of aromatic hydrocarbon, about 20% of paraffin and naphthene and the main components of aromatic hydrocarbon were 15% of ethyltoluene, 14% of pseudocumene and about 5% of mesitylene were added with 100 parts of 37% Formalin and 45 parts of concentrated sulfuric acid, and the mixture was heated and agitated at the temperature of 80° C. for five hours. After the completion of reaction, 60 parts of liquid heavy aromatic hydrocarbon-formaldehyde resin were obtained by carrying out the same operation as described in Example 1.

*Analysis.*—C, 77.60%; H, 9.05%; O, 13.35%. Molecular weight: 277.

*Example 3*

A mixture of 100 parts of the above unpolymerized petroleum resin, 42 parts of α-polyoxymethylene and 17 parts of zinc chloride was heated and agitated in acetic acid solvent at the temperature of 80° C. for five hours. After the completion of reaction, the catalyst, acetic acid and unreacted α-polyoxymethylene were removed from the reaction mixture to obtain 40 parts of liquid heavy aromatic hydrocarbon-formaldehyde resin.

*Analysis.*—O, 13%. Molecular weight: 336.

*Example 4*

50 parts of liquid heavy aromatic hydrocarbon-formaldehyde resin which were obtained in Example 2, 40 parts of phenol and 0.04 part of paratoluene sulphonic acid as a catalyst were thoroughly mixed and the mixture was heated on an oil bath at the temperature of 130° C. for three hours. The water content was freed from the reaction mixture to obtain solid dark brown resin. The resin was pulverized and then was mixed with 2 parts of hexamethylenetetramine and heat-molded under pressure to obtain a cured resin having a superior electric insulation, chemicals proof and water resisting properties.

*Example 5*

Example 4 was repeated except that 48 parts of monochlorobenzene was used in the place of phenol to obtain solid dark brown resin. The resin was pulverized and was mixed with 3 parts of hexamethylenetetramine. The mixture was heat-molded under pressure to obtain insoluble and unmeltable cured resin.

*Example 6*

50 parts of liquid heavy aromatic hydrocarbon-formaldehyde resin which were obtained in Example 2, 70 parts of phenol-formaldehyde resin (Novolak) and 0.01 part of paratoluenesulphonic acid as a catalyst were thoroughly mixed and heated on an oil bath at the temperature of 130° C. for one hour to obtain a solid dark brown resin. The resin was pulverized and mixed together with 2 parts of hexamethylenetetramine and the mixture was heat-molded under pressure to obtain an insoluble and unmeltable cured resin.

*Example 7*

50 parts of heavy aromatic hydrocarbon-formaldehyde resin obtained in Example 3, 43 parts of m-cresol and 0.04 part of paratoluenesulphonic acid as a catalyst were thoroughly mixed. When the mixture was heated at the temperature of 140° C. for two hours, the water content was vigorously separated to obtain solid dark brown resin. The resin was pulverized and mixed together with 3 parts of hexamethylenetetramine and then the mixture was heat-molded under pressure to obtain cured resin having good electric insulation and chemicals proof properties.

*Example 8*

50 parts of heavy aromatic hydrocarbon-formaldehyde resin which were obtained in Example 3, 0.05 part of paratoluenesulphonic acid were thoroughly mixed and heated on an oil bath at the temperature of 150° C. for four hours to obtain a dark brown resin having the melting point of 75° C. The resin was pulverized and mixed with 3 parts of hexamethylene tetramine and the mixture was heat-molded under pressure to obtain an insoluble and unmeltable mold.

*Example 9*

100 parts of xylene bottom which were obtained in aromatic extraction step of Udex process were added with 80 parts of 37% Formalin and 25 parts of concentrated sulfuric acid. The mixture was heated and agitated at the temperature of 90° C. for five hours. After the completion of reaction, the catalyst was removed and the unreacted materials were removed under a reduced pressure from the reaction mixture to obtain 45 parts of heavy aromatic hydrocarbon-formaldehyde resin.

*Analysis.*—Oxygen, 12.5%. Average molecular weight: 300.

Said resin was thoroughly mixed with 33 parts of phenol and 0.03 part of paratoluenesulphonic acid as a catalyst and the mixture was heated on an oil bath at the temperature of 130° C. for three hours to obtain a solid reddish brown resin. The resin was thoroughly pulverized and added with 2 parts of hexamethylenetetramine and then the mixture was heat pressed to obtain an insoluble and unmeltable cured resin.

*Example 10*

100 parts of the matter which was obtained by the distillation and purification of distillation residue in the manufacturng step of ethylbenzene and of which the composition consisted of mainly di-, tri- and tetra-ethylbenzene were added with 20 parts of paraformaldehyde and 15 parts of concentrated sulfuric acid. The mixture was heated and agitated at the temperature for two hours. After the completion of reaction, the catalyst and the unreacted paraformaldehyde were removed and the unreacted materials were removed from the reaction mixture by a steam distillation to obtain 90 parts of heavy aromatic hydrocarbon-formaldehyde resin.

*Analysis.*—Oxygen, 8.5%. Average molecular weight: 450.

The resin was thoroughly mixed with 50 parts of m-cresol and 0.05 part of paratoluenesulphonic acid. When the mixture was heated in an oil bath at the temperature of 130° C. for two hours, the water content was vigorously separated from the mixture to obtain a solid blackish brown resin. The resin was pulverized and mixed together with 4 parts of hexamethylenetetramine and the mixture was heat pressed to obtain an insoluble and unmeltable cured product.

What we claim is:

1. A process for the manufacture of liquid heavy aromatic hydrocarbon-formaldehyde resins comprising reacting heavy mononuclear aromatic hydrocarbon having at least eight carbon atoms with formaldehyde in presence of acidic catalyst at a temperature of about 80° C. under a pressure of 1 to 100 atmospheric pressure, the quantity of hydrocarbon to formaldehyde being in a ratio of 1:1.1–1.4, then heat curing under elevated pressure the formed resin in the presence of hexamethylenetetramine.

2. A process for the manufacture of liquid heavy aromatic hydrocarbon-formaldehyde resins comprising reacting heavy mononuclear aromatic hydrocarbon having at least eight carbon atoms with formaldehyde in presence of acidic catalyst at a temperature of about 80° C. under a pressure of 1 to 100 atmospheric pressure, the quantity of hydrocarbon to formaldehyde being in a ratio of 1:1.1–1.4, then condensing the formed resin with an aromatic hydrocarbon having electron donative group in presence of acidic catalyst to obtain a material having a melting point of 30°–200° C., and thereafter heat curing under elevated pressure the material in the presence of hexamethylenetetramine.

References Cited

UNITED STATES PATENTS

| | | | |
|---|---|---|---|
| 2,066,090 | 12/1936 | Borst | 260—67 |
| 2,200,763 | 5/1940 | Anderson et al. | 260—67 |
| 2,954,360 | 9/1960 | Krizikalla et al. | 260—67 XR |
| 3,119,781 | 1/1964 | Harvey et al. | 260—67 XR |
| 3,178,393 | 4/1965 | Brandt et al. | 260—67 |
| 3,231,544 | 1/1966 | Cotman et al. | 260—67 |

WILLIAM H. SHORT, *Primary Examiner.*

L. M. MILLER, *Assistant Examiner.*